US009054949B2

(12) United States Patent
Hathorn et al.

(10) Patent No.: US 9,054,949 B2
(45) Date of Patent: *Jun. 9, 2015

(54) UPDATING ZONE INFORMATION IN A DISTRIBUTED SWITCH OF DATA FORWARDERS

(75) Inventors: Roger G. Hathorn, Tucson, AZ (US); Sriharsha Jayanarayana, Bangalore (IN); Henry J. May, Cedar Falls, IA (US); Stefan Roscher, Stuttgart (DE); Bharath B. Somayaji, Bangalore (IN); Sudheer R. Yelanduru, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 460 days.

This patent is subject to a terminal disclaimer.

(21) Appl. No.: 13/449,164

(22) Filed: Apr. 17, 2012

(65) Prior Publication Data
US 2013/0272313 A1    Oct. 17, 2013

(51) Int. Cl.
*H04L 12/66* (2006.01)
*H04L 12/751* (2013.01)
*H04L 12/755* (2013.01)

(52) U.S. Cl.
CPC .............. *H04L 45/02* (2013.01); *H04L 45/021* (2013.01)

(58) Field of Classification Search
USPC ........................................................ 370/419
See application file for complete search history.

(56) References Cited

U.S. PATENT DOCUMENTS

| 6,973,529 | B2 * | 12/2005 | Casper et al. ................. 710/316 |
| 7,177,295 | B1 * | 2/2007 | Sholander et al. ............ 370/338 |
| 2002/0184529 | A1 * | 12/2002 | Foster et al. .................. 713/201 |
| 2004/0057423 | A1 * | 3/2004 | Beckmann et al. ........... 370/352 |
| 2004/0103159 | A1 * | 5/2004 | Williamson et al. .......... 709/206 |
| 2005/0249186 | A1 * | 11/2005 | Kelsey et al. ................. 370/349 |
| 2008/0279132 | A1 * | 11/2008 | Noishiki et al. ............... 370/312 |
| 2011/0261821 | A1 * | 10/2011 | Hillier et al. .................. 370/394 |
| 2012/0039163 | A1 * | 2/2012 | Nakajima ...................... 370/217 |
| 2013/0208630 | A1 * | 8/2013 | Bobrek .......................... 370/276 |

OTHER PUBLICATIONS

Preliminary Remarks, Feb. 26, 2013, for U.S. Appl. No. 13/777,877, filed on Feb. 26, 2013 by R.G. Hathorn et al., Total 2 pp. [18.451C1 (PrelimRemarks)].
U.S. Appl. No. 13/777,877, filed Feb. 26, 2013, entitled "Updating Zone Information in a Distributed Switch of Data Forwarders", invented by R.G. Hathorn et al., Total 34 pp. [18.451C1 (Appln)].
Desanti et al., "Distributed FCT", dated Oct. 2011, pp. 1-11.
Desanti et al., "VA Port Protocols", dated Dec. 2011, pp. 1-18.
Desanti et al., "Distributed Switching", dated Oct. 2011, pp. 1-10.

* cited by examiner

*Primary Examiner* — Gerald Smarth
(74) *Attorney, Agent, or Firm* — David W. Victor; Konrad Raynes Davda & Victor LLP

(57) ABSTRACT

Provided are a computer program product, system, and method for updating zone information in a distributed switch of data forwarders. For each data forwarder, a sequence number is maintained for zone distribution messages sent to the data forwarder. A change to the ports in the network is detected comprising at least one of an allocation or deallocation of at least one port in the network. The sequence number for each data forwarder is incremented in response to detecting the change. For each data forwarder, a zone distribution message is generated indicating the at least one port allocated and/or deallocated, port information indicating each port in the network that may communicate with each other port, and the sequence number for the data forwarder. The generated zone distribution message is transmitted for each data forwarder to the data forwarder for which the zone distribution message was added.

26 Claims, 11 Drawing Sheets

UPDATING ZONE INFORMATION IN A DISTRIBUTED SWITCH OF DATA FORWARDERS

BACKGROUND OF THE INVENTION

1. Field of the Invention

The present invention relates to a computer program product, system, and method for updating zone information in a distributed switch of data forwarders.

2. Description of the Related Art

A distributed switch includes a plurality of interconnected forwarders that provide ports to interconnect host ports. In a distributed Fibre Channel over Ethernet (FCoE) forwarder, a controlling FCoE forwarder (cFCF) is in communication with one or more FCoE data forwarders (FDFs) over an Ethernet network. The cFCF and connected FDFs provide Fibre Channel connections to hosts in a Fibre Channel Fabric. The cFCF maintains zone information for the network in which the distributed FCF operates and updates the zone information of the FDFs with changes to zone information, such as the allocation and deallocation of ports.

The forwarders in the distributed switch use the zone information to determine whether host ports may communicate with target ports in the network.

There is a need in the art for improved techniques for managing the updating of zone information among the forwarders in a distributed switch comprised of interconnected forwarders.

SUMMARY

Provided are a computer program product, system, and method for updating zone information in a distributed switch of data forwarders. For each data forwarder, a sequence number is maintained for zone distribution messages sent to the data forwarder. A change to the ports in the network is detected comprising at least one of an allocation or deallocation of at least one port in the network. The sequence number for each data forwarder is incremented in response to detecting the change. For each data forwarder, a zone distribution message is generated indicating the at least one port allocated and/or deallocated, port information indicating each port in the network that may communicate with each other port, and the sequence number for the data forwarder. The generated zone distribution message is transmitted for each data forwarder to the data forwarder for which the zone distribution message was added.

In further embodiments, zone information is maintained indicating each port that may communicate with each other port in the network and a last received sequence number included in a last accepted zone distribution message. A zone distribution message is received from a controlling forwarder indicating at least one port allocated and/or deallocated, port information indicating each port in the network that may communicate with each other port, and the sequence number indicating a sequence number of the zone distribution message. A determination is made as to whether the sequence number in the zone distribution message is greater than the last received sequence number. The zone information is updated to indicate the at least one port allocated and/or deallocated and include information on the ports in the network that may communicate with each other port in response to determining that the sequence number in the zone distribution message is greater than the last received sequence number.

DETAILED DESCRIPTION

In prior art distributed switches comprised of forwarders, if zone distribution messages are received and processed by the data forwarders out of order, then the zone information at the data forwarders may not include ACL entries for ports that have been allocated in the network if the zone distribution messages allocating the ports have not yet arrived. Further, if a zone distribution message is received out of order, then it may provide links for ports not yet allocated in the zone information at the data forwarder. The data forwarder would not be able to include the links in the zone distribution message in the zone information for the port for which the data forwarder has not yet received the zone distribution message allocating the port. Further, if a zone distribution message deallocating a port is received out of order, then the port may not be properly deallocated before other links are added, which may result in security issues if links remain for ports that should have been deallocated from the zone information before other links are added.

Described embodiments provide techniques for handling the receipt of zone distribution messages out of sequence by the controlling forwarders by providing a sequence number with zone distribution messages so that the data forwarder will reject a zone distribution message having a sequence number less than a sequence number of a last accepted and processed zone distribution message. Rejection of a zone distribution message causes the controlling forwarder to rebuild a zone distribution message to allocate or deallocate the port, as indicated in the rejected message, and update the peering entries in the message to indicate the current connections.

Figure 1:
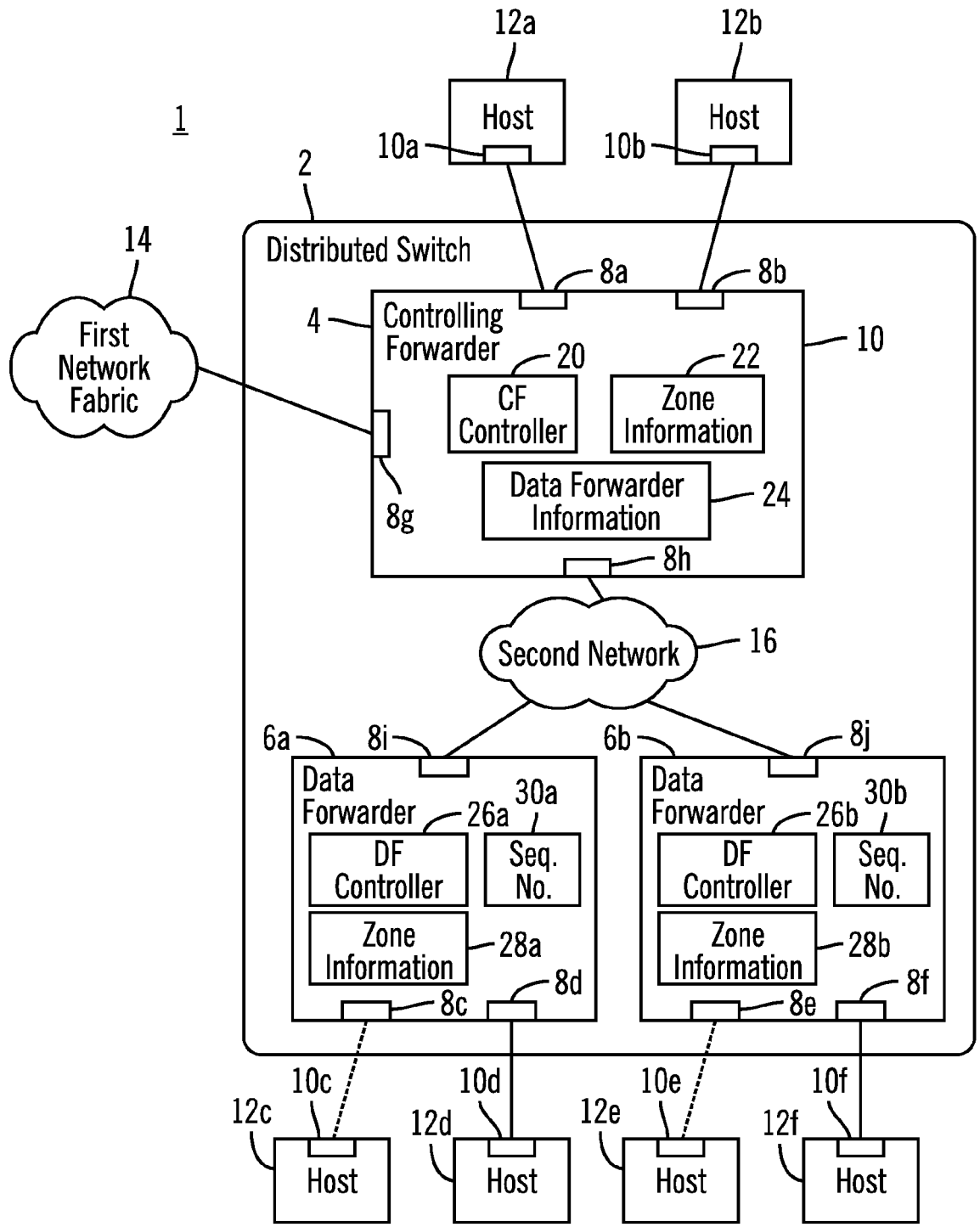
FIG. 1 illustrates an embodiment a distributed switch.

FIG. 1 illustrates an embodiment of a network computing environment 1 including a distributed switch 2 comprised of a controlling forwarder 4 and one or more data forwarders 6a, 6b. The forwarders 4, 6a, 6b include ports 8a, 8b, 8c, 8d, 8e, 8f, to connect the distributed switch 2 to ports 10a, 10b, 10c, 10d, 10e, 10f of hosts 12a, 12b, 12c, 12d, 12e, 12f, respectively, and a port 8g connecting to a first network fabric 14 having further hosts and devices. The controlling forwarder 4 communicates via port 8h with the data forwarders over a second network 16 via data forwarder ports 8i and 8j.

The controlling forwarder 4 includes a controlling forwarder (CF) controller 20 to perform the controlling forwarder 4 operations; zone information 22 providing information on ports in the network and the ports with which each port may communicate; and data forwarder information 24 on the data forwarders 6a, 6b in the distributed switch 2.

Each data forwarder 6a, 6b includes a data forwarder (DF) controller 26a, 26b, zone information 28a, 28b providing information on ports in the network and the ports with which each port may communicate, and a sequence number 30a, 30b indicating a sequence number included in a last accepted and processed zone distribution message from the controlling forwarder 4.

The controlling forwarder 4 manages zone information of ports that may communicate with other ports in the network 1 for the distributed switch 2. When ports are allocated and deallocated in the network 1, the controlling forwarder 4 transmits information on the port updates to the data forwarders 6a, 6b so that the data forwarders 6a, 6b may update their local zone information 28a, 28b. The data forwarders 6a, 6b use their local zone information 28a, 28b to determine whether a host port 10a-10f, transmitting data or a message, may communicate with a target port of the communication.

Although two data forwarders 6a, 6b are shown, there may be additional data forwarders in the distributed switch 2 managed by the controlling forwarder 4 and/or additional controlling forwarders. Further, the distributed switch 2 may connect to additional distributed switches in the network. The hosts 10a-10f may comprise servers, initiators, targets, storage devices, etc.

The first network fabric 14 may comprise a Fibre Channel Fabric. The forwarders 4, 6a, 6b may communicate with the hosts 12a-12f using Fibre Channel protocols. The second network 16 may comprise an Ethernet network, such that the controlling forwarder 4 and data forwarders 6a, 6b communicate using a Fibre Channel over Ethernet (FCoE) protocol. In such Fibre Channel embodiments, the distributed switch 2 may comprise a distributed FCoE forwarder (Distributed FCF), the controlling forwarder 4 may comprise a controlling FCoE forwarder (cFCF), and the data forwarders 6a, 6b may comprise FCoE data plane forwarders (FDFs). The ports may comprise physical ports or virtual ports providing Fibre Channel links. In certain embodiments, the ports 8h, 8i, and 8j connecting the forwarders 4, 6a, 6b may comprise Fibre Channel Virtual A ports (VA Ports), providing virtual links.

The CF 20 and DF 26a, 26b controllers may be implemented as an application specific integrated circuit (ASIC) or a processor executing computer readable program instructions in a non-volatile storage, or a combination thereof. In this way, the controllers 20, 26a, 26b include hardware to execute code or logic to perform the operations described herein. The controllers 20, 26a, 26b may include a volatile or non-volatile memory to store zone information 22, 28a, 28b, data forwarder information 24, sequence number 30a, 320b information, and other information used during processing.

Figure 2:
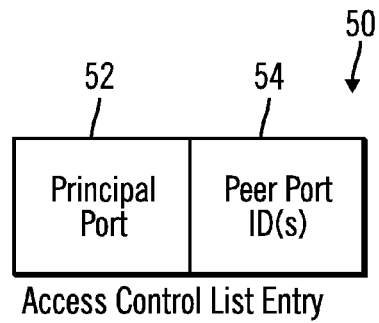
FIG. 2 illustrates an embodiment of an access control list (ACL) entry.

FIG. 2 illustrates an embodiment of an access control list (ACL) entry 50 that is included in the zone information 22, 28a, 28b of the forwarders 4, 6a, 6b for each allocated port. An ACL entry 50 includes a principal port 52 and one or more peer port identifiers (IDs) 54 to which the principal port 52 may communicate. The forwarders 4, 6a, 6b will allow a transmission from a source port to a target port if there is an ACL entry 50 with the source port as the principal port 52 and the target port as one of the peer ports 54.

Figure 3:
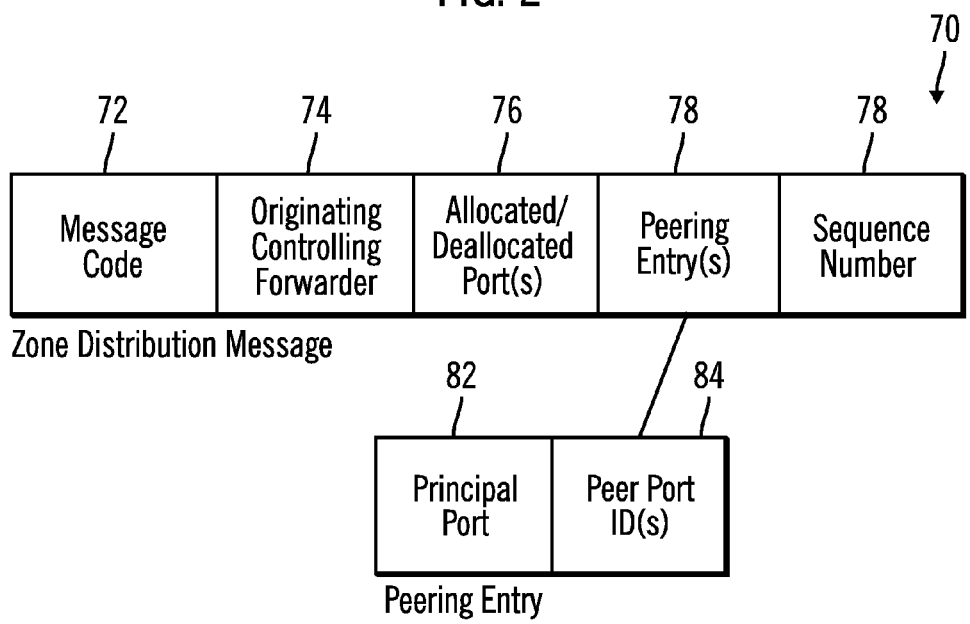
FIG. 3 illustrates an embodiment of a zone distribution message.

FIG. 3 illustrates an embodiment of a zone distribution message 70 the controlling forwarder 4 transmits to the data forwarders 6a, 6b to provide information on allocated and deallocated ports in the network 1. The zone distribution message 70 includes a message code 72 identifying the message as a zone distribution message; an origination controlling forwarder 74 that sent the message; the allocated/deallocated port(s) 76 indicating one or more ports that are allocated and/or deallocated; one or more peering entries 78 identifying ports that may communicate with one another; and a sequence number 80 the controlling forwarder 4 assigns the message 70. Each peering entry 78 identifies a principal port 82 and one or more peer port IDs 84 with which the principal port 82 may communicate. In certain embodiments, the zone distribution message 78 indicates each port in all the zones and the ports with which that port may communicate. The peering entries 78 may be provided for one or more zones configured for the distributed switch 2.

In Fibre Channel embodiments, the zone distribution message 70 may comprise a N_Port_ID and Zoning ACL Distribution (NPZD) message.

Figure 4:
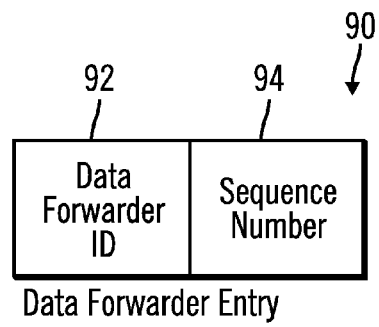
FIG. 4 illustrates an embodiment of data forwarder entry.

FIG. 4 illustrates an embodiment of a data forwarder entry 90 in the data forwarder information 24 maintained by the controlling forwarder 4 including a data forwarder ID 92, comprising one of data forwarders 6a, 6b, and a sequence number 94 that indicates a sequence number of a last zone distribution message sent to the data forwarder 92. The controlling forwarder 4 increments the sequence number 94 for a data forwarder 92 each time a zone distribution message is sent to the data forwarder 92.

Figure 5:
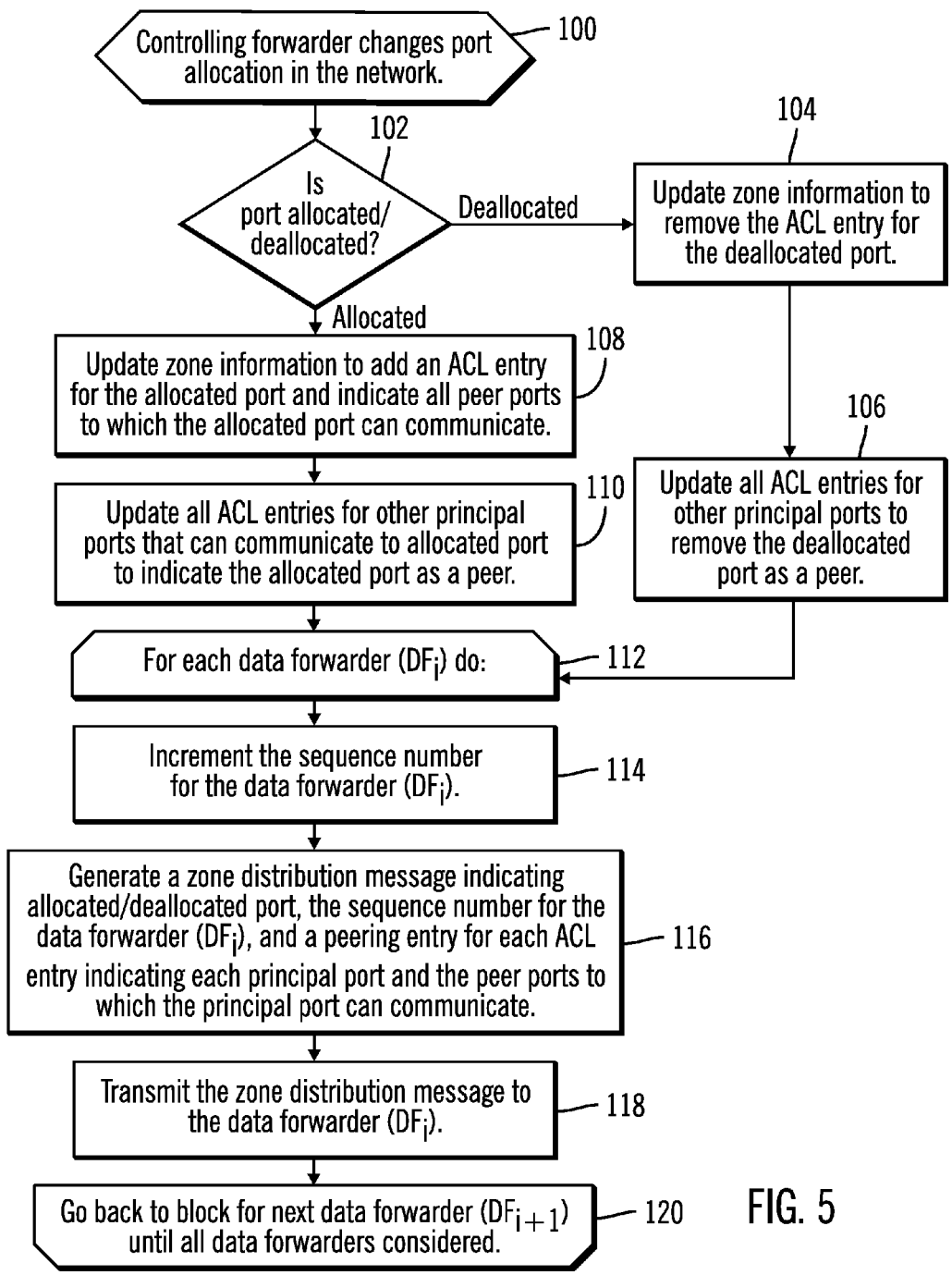
FIG. 5 illustrates an embodiment of controlling forwarder operations to update zone information for the network.

FIG. 5 illustrates an embodiment of operations performed by the CF controller 20 to change the port allocation in the network 1. If (at block 102) a port is being deallocated, then the CF controller 20 updates (at block 104) the zone information 22 to remove the ACL entry 50 for the deallocated port, i.e., the ACL entry 50 having the deallocated port as the principal port 52 (FIG. 2). The ACL entries for other principal ports are updated (at block 106) to remove the deallocated port as a peer port 54 to indicate that no ports may communicate with the deallocated port.

If (at block 102) a port is being allocated, then the CF controller 20 updates (at block 108) the zone information 22 to add an ACL entry 50 for the allocated port, indicating the allocated port as the principal port 52, and indicate all peer ports to which the allocated port can communicate as the peer ports 54. All ACL entries 50 for other principal ports that can communicate to the allocated port are updated (at block 110) to indicate the allocated port as a peer port 54.

The CF controller 20 performs a loop (at blocks 112-120) of the operations at blocks 114-118 for each data forwarder 6a, 6b ($DF_i$) indicated in the data forwarder information 24. The loop at blocks 112-120 ends after messages are sent to all the active data forwarders 6a, 6b indicated in the data forwarder information 74. At block 114, the CF controller 20 increments the sequence number 94 for the data forwarder (DFi), as indicated in the data forwarder entry 90 (FIG. 4) for $DF_i$. The CF controller 20 generates (at block 116) a zone distribution message 70 indicating, among other information, the message code 72; the controlling data forwarder 4 in field 74; allocated/deallocated one or more ports 76; the sequence number 94 for the data forwarder (DFi); and a peering entry 78 for each ACL entry 50 indicating each principal port 82 and the peer ports 84 to which it can communicate. The generated zone distribution message 70 is sent to the data forwarder ($CF_i$).

Figure 6:
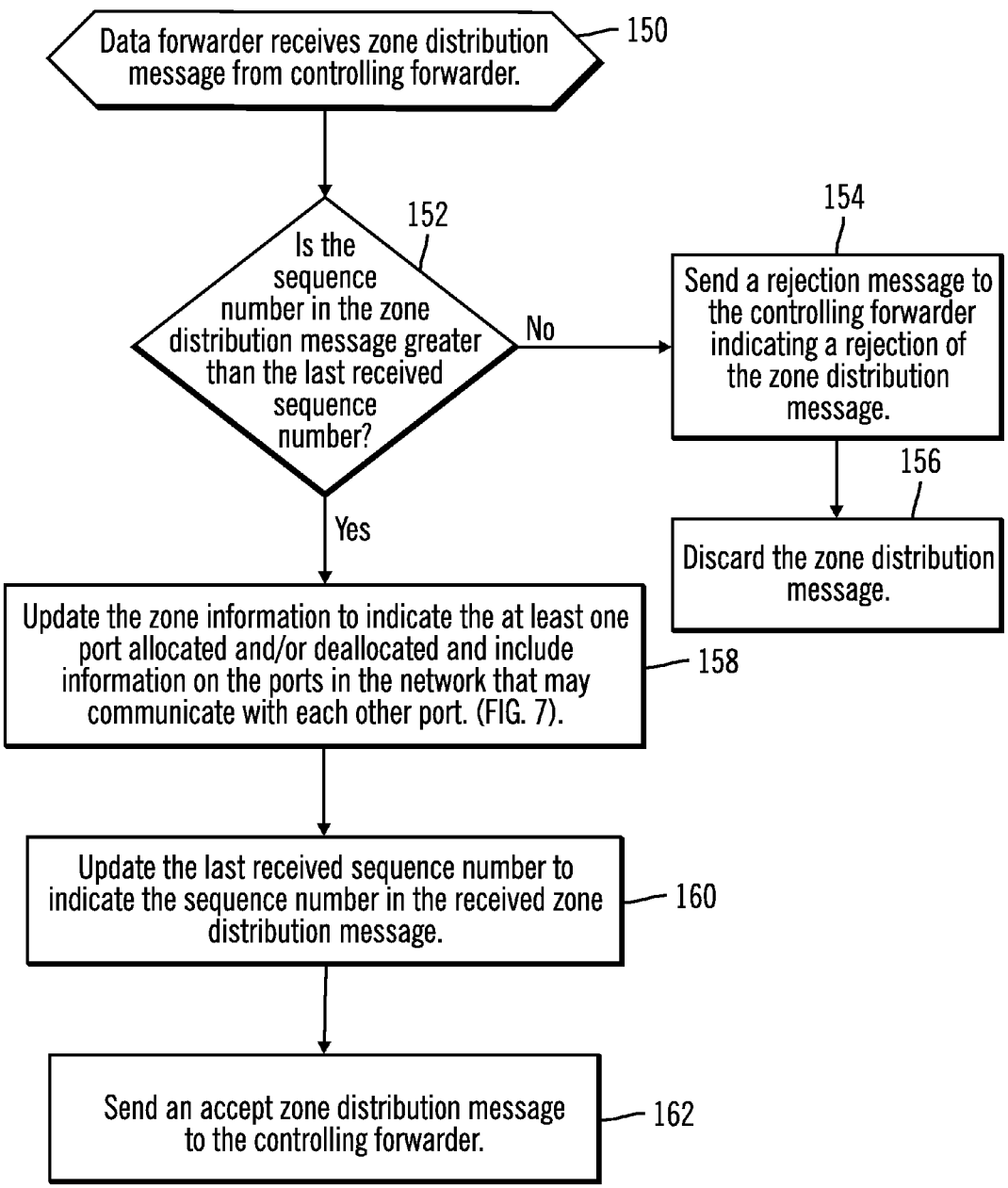
FIGS. 6 and 7 illustrate an embodiment of data forwarder operations to process a zone distribution message.

FIG. 6 illustrates an embodiment of operations performed by the DF controllers 26a, 26b to process a received zone distribution message 70. Upon receiving (at block 150) a zone distribution message 70, if (at block 152) the sequence number 80 in the zone distribution message 70 is less than the last received sequence number 30a, 30b, then the zone distribution message 70 has been received out of sequence and the DF controller 26a, 26b sends (at block 154) a rejection message to the controlling forwarder 4 indicating a rejection of the zone distribution message 70. The rejection message may identify the receiving data forwarder 6a, 6b and the message, such as with the sequence number 80. The rejected zone distribution message 70 is discarded without applying any of the changes indicated in the rejected zone distribution message 70.

Figure 7:
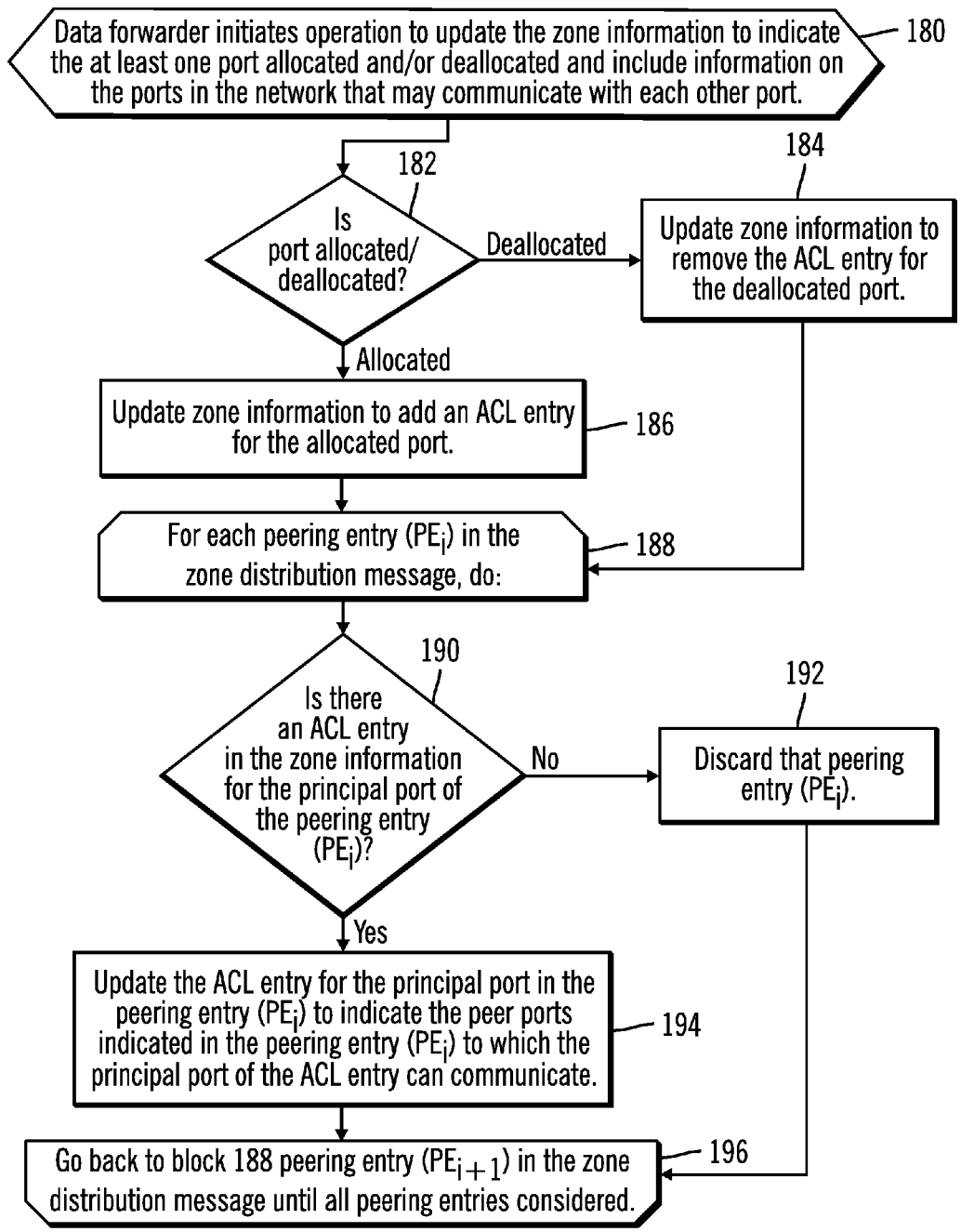

If (at block 152) the sequence number 80 in the zone distribution message 70 is greater than the last received sequence number 30a, 30b, then the DF controller 26a, 26b accepts the message 70 and updates (at block 158) the zone information 28a, 28b to indicate the at least one port allocated and/or deallocated and include information on the ports in the network that may communicate with each other port by updating the ACL entries 50. FIG. 7 provides a further embodiment for updating the data forwarder zone information 28a, 28b. The last received sequence number 30a, 30b is updated (at block 160) to indicate the sequence number 80 in the received zone distribution message 70. The DF controller 26a, 26b sends (at block 162) an accept zone distribution message to the controlling forwarder 4.

With the described embodiments of FIG. 6, a zone distribution message 70 may be processed out-of-order if it has a sequence number 80 greater than the sequence number 30a, 30b of the last processed zone distribution message. However, if the zone distribution message 70 has a sequence number 80 less than the last accepted and received sequence number 30a, 30b, then it is rejected and not applied to update the local zone information 28a, 28b.

FIG. 7 illustrates an embodiment of operations performed by the DF controllers 26a, 26b to update their local zone information 28a, 28b to indicate the at least one port allocated and/or deallocated and include information on the ports in the network that may communicate with each other port, such as performed at block 158 in FIG. 6. Upon initiating (at block 180) the operation to update the local zone information 30a, 30b, if (at block 182) a port is being deallocated, as indicated in field 76 of the zone distribution message 70, then the DF controller 26a, 26b updates (at bock 184) the zone information 30a, 40b to remove the ACL entry 50 for the deallocated port. If (at block 182) a port is being allocated, then the DF controller 26a, 26b updates (at block 186) the zone information 28a, 28b to add an ACL entry 50 for the allocated port. The DF controller 26a, 26b then performs a loop (at block 188 through 196) of the operations at blocks 190 through 194 for each peering entry ($PE_i$) 78 included in the zone distribution message 70. If (at block 190) the zone information 28a, 28b does not include an ACL entry 50 for the principal port 82 of the peering entry (PEi) 78, i.e., an ACL entry 50 having as a principal port 52 the principal port 82 of the peering entry ($PE_i$), then that peering entry ($PE_i$) is discarded (at block 192) and the connection information for the discarded peering entry ($PE_i$) is not applied to the local zone information 28a, 28b. If (at block 190) there is an ACL entry 50 in the zone information 28a, 28b for the principal port 82 of the peering entry ($PE_i$) 80, then the ACL entry 50 for the principal port 82 in the peering entry (PEi) 78 is updated (at block 194) to indicate the peer ports 84 indicated in the peering entry (PEi) to which the principal port 52 of the ACL entry 50 can communicate. Control proceeds from block 192 or 194 to block 196 to perform another iteration of the loop of operations at blocks 188-196 until all the peering entries (PEi) 78 in the received zone distribution message 70 are considered.

With the described embodiments, if a zone distribution message 70 is received out of order but having a higher sequence number than the sequence number 30a, 30b of the last received zone distribution message 70, then connection information is only updated for those peer entries (PEi) that concern ports indicated as allocated in the local zone information 28a, 28b. If a port for a peering entry is not indicated as allocated in the zone information, then that port may be added in a previously transmitted zone distribution message 70, which may have not been received, having a lower sequence number than the received zone distribution message 70 being processed. In such case, the entries concerning the port allocated in the zone distribution that was not processed before the current message are not applied to the zone information 28a, 28b because the port to which they apply has not been allocated yet in the local zone information 28a, 28b.

Figure 8:
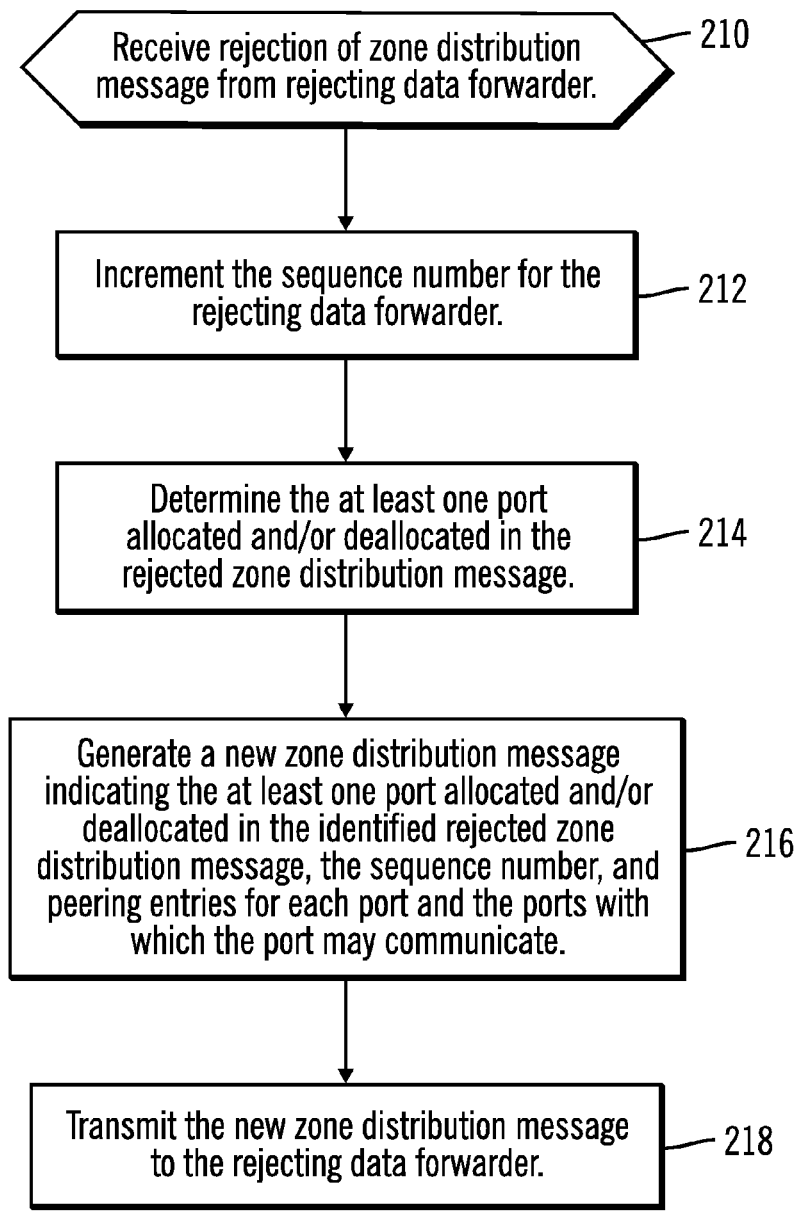
FIG. 8 illustrates an embodiment of controlling forwarder operations to process a rejection of a zone distribution message.

FIG. 8 illustrates an embodiment of operations performed by the CF controller 20 to process a rejection message indicating rejection of an identified zone distribution message 70 from a rejecting data forwarder 6a, 6b, such as sent at block 154 in FIG. 6. Upon receiving (at block 210) the rejection message, the CF controller 20 increments (at block 212) the sequence number 94 in the data forwarder entry 90 for the rejecting data forwarder 6a, 6b. A determination is made (at block 214) of the at least one port allocated and/or deallocated 76 in the rejected zone distribution message 70. The CF controller 20 may maintain a log of sent zone distribution messages 70 that have not yet been accepted. The CF controller 20 generates (at block 216) a new zone distribution message 70 indicating the determined at least one port allocated and/or deallocated in the identified rejected zone distribution message, the sequence number, and peering entries 78 for each port and the ports with which the port may communicate. The new zone distribution message 70 is transmitted (at block 218) to the rejecting data forwarder 6a, 6b, which it will accept because this rebuilt zone distribution message 70 has the highest yet generated sequence number.

With the operations of FIG. 8, the rebuilt zone distribution message 70 indicates the one or more ports indicated as allocated/deallocated in the rejected message and indicates peering entries 78 based on the current ACL entries 50 in the zone information 22, thus providing the current state of network port connections for the zones.

Figure 9:
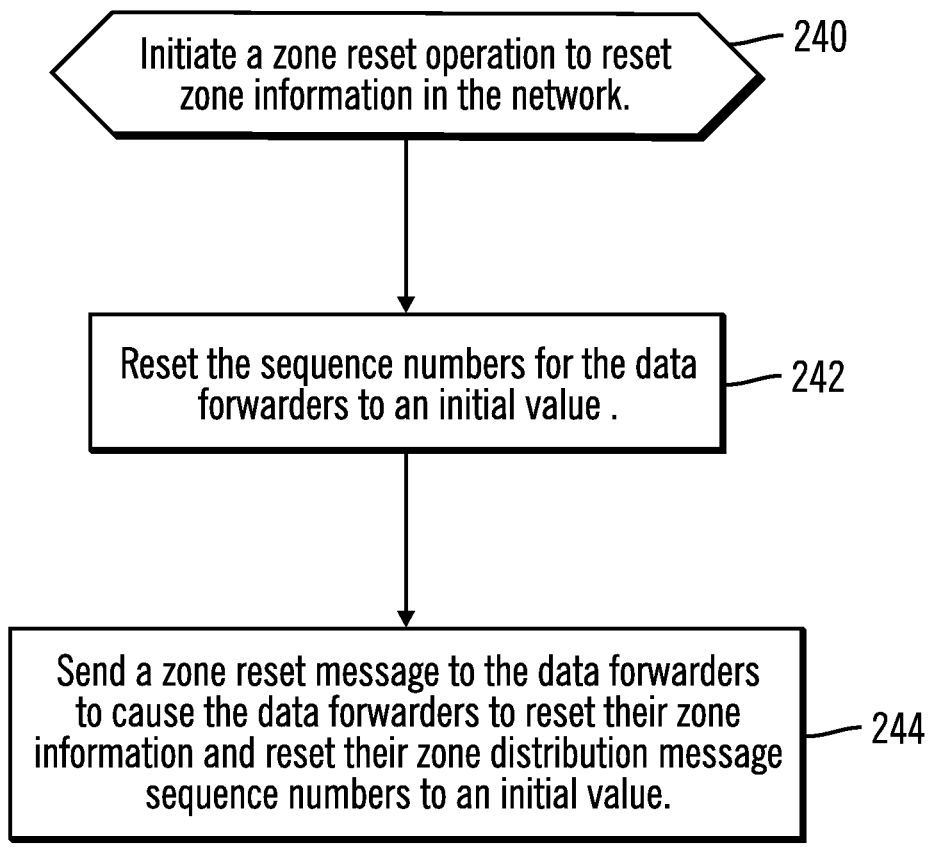
FIG. 9 illustrates an embodiment of zone reset operations.

FIG. 9 illustrates an embodiment of operations performed by the CF controller 20 as part of a zone reset, when all the zone information is being reset. Upon initiating (at block 240) a zone reset operation, the CF controller 20 resets (at block 242) the sequence numbers 94 for the data forwarders 6a, 6b in the data forwarder entries 90 to an initial value, e.g., zero. The CF controller 20 sends (at block 244) a zone reset message to the data forwarders 6a, 6b, which causes the data forwarders 6a, *b* to reset their zone information 28a, 28b and reset their zone distribution message sequence numbers 30a, 30b to an initial value, e.g., zero. In Fibre Channel embodiments, the zone reset message may comprise an Active Zoning ACL Distribution (AZDL) message. The data forwarders 6a, 6b reset their sequence numbers 30a, 30b in response to the zone reset message or upon establishment of a first communication path between the data forwarder and the controlling switch. The sequence numbers at the controlling forwarder 4 and the data forwarders 6a, 6b may also be reset when a virtual link is established between the controlling forwarder 4 and the data forwarders 6a, 6b. The zone reset message may be sent when the virtual links are established to also initialize the sequence number at this time.

Figure 10:
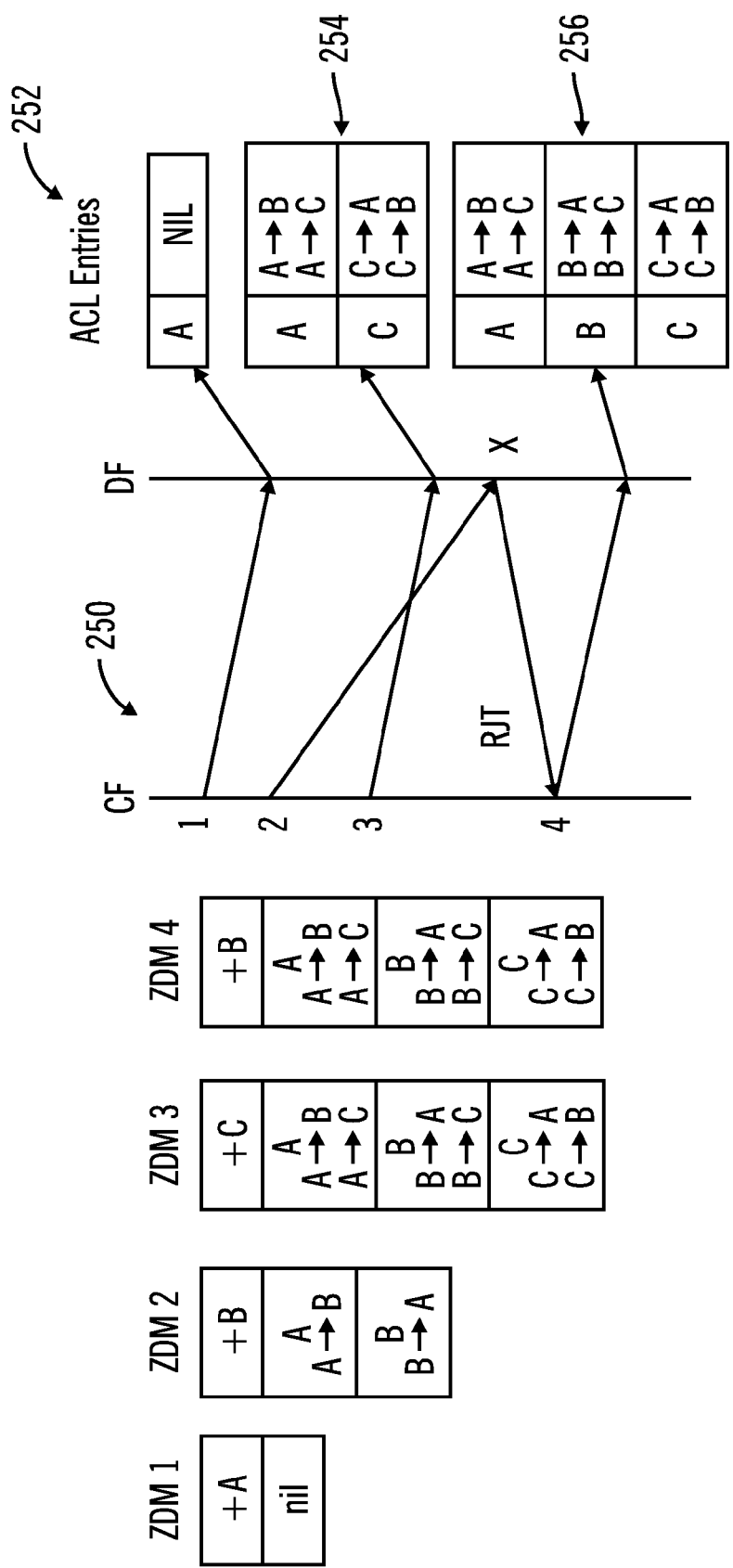
FIGS. 10-13 illustrate examples of the processing of zone distribution messages according to the operations of FIGS. 5-9.

FIG. 10 illustrates an example of the result of the operations performed in FIGS. 5-9 on zone information when processing four zone distribution messages ZDM 1, ZDM 2, ZDM 3, ZDM 4 for ports A, B, and C. ZDM 1, 2, and 3 are sent to allocate ports A, B, and C, respectively, and provide peer information for the ports, as indicated by the arrows connecting ports. In ZDM 1, the first port A is allocated, with no connections. In ZDM 2, port B is allocated with peering entries for links between A and B. In ZDM 3, port C is allocated with peering entries for links between A, B, and C. FIG. 10 shows a timeline 250 of when the zone distribution messages sent from the controlling forwarder (CF) 4 are received at the data forwarder (DF) 6a, 6b, which shows that the data forwarder (DF) receives ZDM 3 before ZDM 2. Because the messages are sent out of order, the data forwarder (DF) sends a rejection message (RJT) with respect to ZDM 2, which causes the controlling forwarder (CF) to send a rebuilt message according to the operations of FIG. 8 that indicates the port B allocated in the rejected ZDM 2 and includes all the peering entries for the current state of the ports A, B, C. The ACL entries 252 shows how the data forwarder (DF) 6a, 6b adds ACL entries 50 to the zone information 28a, 28b as a result of ZDM 1, ZDM 3 (received out-of-sequence after ZDM 1) and ZDM 4 For ZDM 3, the data forwarder (DF) 6a, 6b performs the operations of FIGS. 6 and 7, adds ACL entries 254 for ports A and C, but not for port B because port B had not been allocated yet in the zone information 28a, 28b, which occurs with the ZDM 2 that has not yet been received when ZDM 3 is processed out of order. Upon receiving ZDM 4 and adding allocated port B, the data forwarder (DF) 6a, 6n may then add ACL entries 256 for all ports A, B, C in the network 1.

Figure 11:
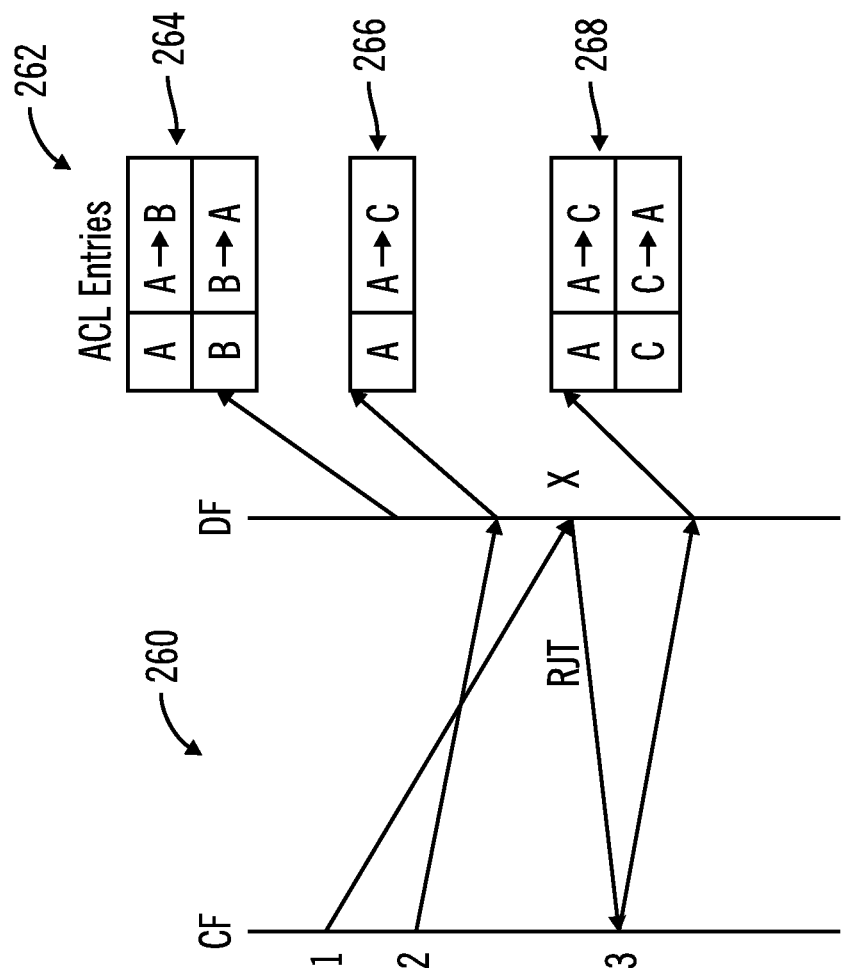

FIG. 11 illustrates an example of the result of the operations performed in FIGS. 5-9 on zone information when processing three zone distribution messages ZDM 1, ZDM 2, and ZDM 3 for ports A, B, and C. ZDM 1 is sent to allocate port C and provide peer information for ports A, B, and C. In ZDM 2, port B is deallocated and provides peering entries for links between A and C. In ZDM 3, port C is allocated with peering entries for links between A and C. FIG. 11 shows a timeline 260 of the zone distribution messages sent between the controlling forwarder (CF) 4 and a data forwarder (DF) 6a, 6b, which shows that the data forwarder (DF) receives ZDM 2 before ZDM 1. Because the messages are sent out of order, the data forwarder (DF) sends a rejection message (RJT) with respect to ZDM 1, which causes the controlling forwarder (CF) to send a rebuilt zone distribution message ZDM 3 according to the operations of FIG. 8 that indicates the port C allocated in the rejected ZDM 1 and includes all the peering entries for the ports A and C, because B was deallocated. The ACL entries 262 shows how the data forwarder (DF) 6a, 6b adds ACL entries 50 to the zone information 28a, 28b as a result of ZDM 2 and the rebuilt message ZDM 3 Initially, there are ACL entries 264 for ports A and B. For ZDM 2, the port B ACL entry is removed, leaving ACL entry 266 for port A, but no ACL entry for port C because, according to the operations of FIGS. 6 and 7, port C had not been allocated yet in the zone information 28a, 28b, which occurs with the ZDM 1 that has not yet been received when ZDM 2 is processed out-of-order. Upon receiving ZDM 3 and adding allocated port C, the data forwarder (DF) 6a, 6n may then add ACL entries 268 for all remaining ports A and C in the network 1.

Figure 12:
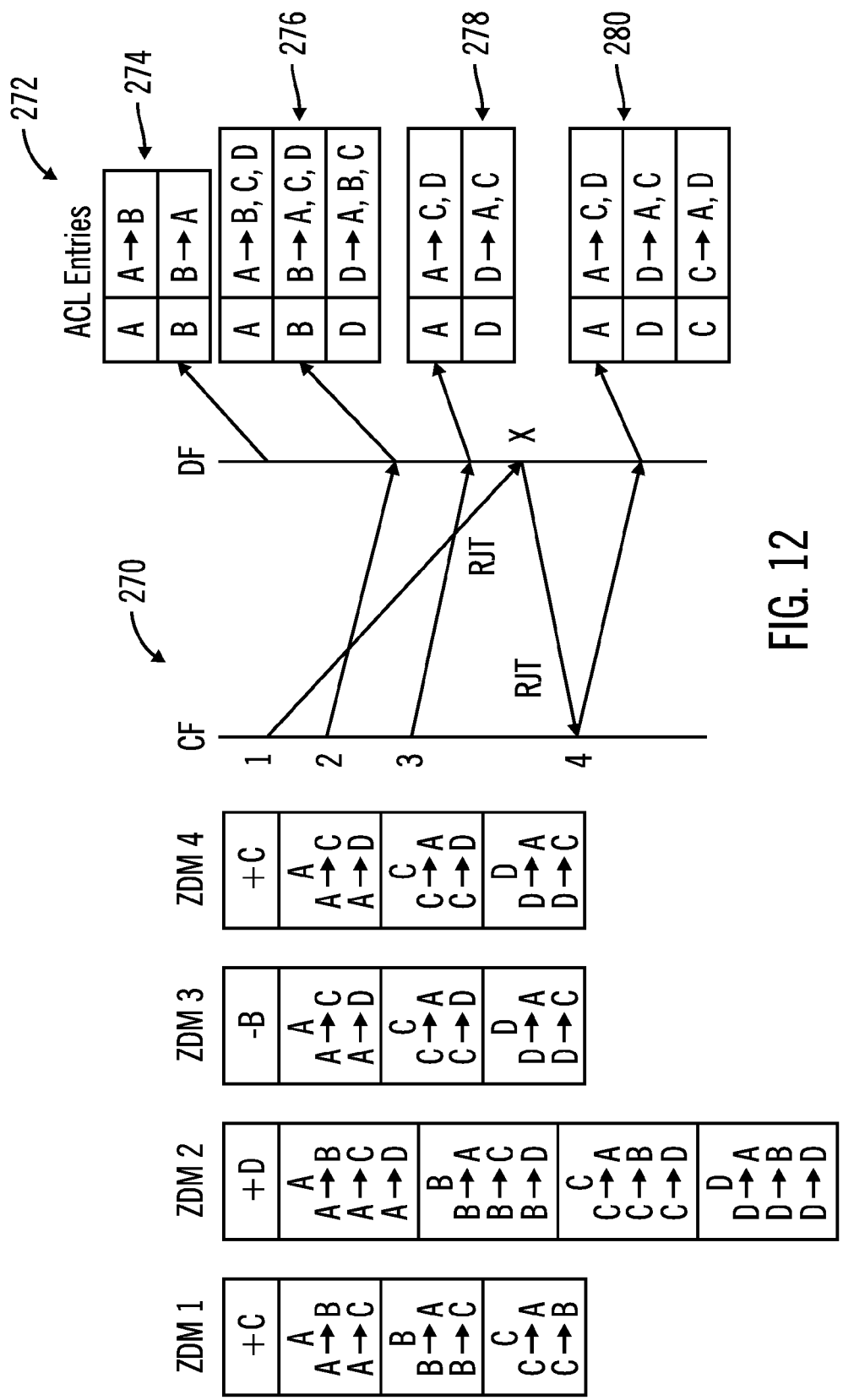

FIG. 12 illustrates an example of the result of the operations performed in FIGS. 5-9 on zone information when processing four zone distribution messages ZDM 1, ZDM 2, ZDM 3, and ZDM 4 for ports A, B, C, and D. ZDM 1 is sent to allocate port C and provide peer information for ports A, B, and C. In ZDM 2, port D is allocated and provides peering entries for links between A, B, C, and D. In ZDM 3, port B is deallocated with peering entries for links between A, C, D. ZDM 4 allocates port C and provides peering entries for links between A, C, and D. FIG. 12 shows a timeline 270 of the zone distribution messages sent between the controlling forwarder (CF) 4 and a data forwarder (DF) 6a, 6b, which shows that the data forwarder (DF) receives ZDM 2 and ZDM3 before ZDM 1. Because the messages are sent out of order, the data forwarder (DF) sends a rejection message (RJT) with respect to ZDM 1, which causes the controlling forwarder (CF) to send a rebuilt zone distribution message ZDM 4 according to the operations of FIG. 8 that indicates the port C allocated in the rejected ZDM 1 and includes all the peering entries for the ports A, C, and D. The ACL entries 272 shows how the data forwarder (DF) 6a, 6b adds ACL entries 50 to the zone information 28a, 28b as a result of ZDM 2, ZDM 3 and the rebuilt message ZDM 4 Initially, there are ACL entries 274 for ports A and B. For ZDM 2, the port D ACL entry is added and the port A and B ACL entries are updated to indicate links between A, B, C and D for ports A, B, and D. There is no ACL entry for port C because ZDM 1 allocating port C has not yet arrived, although the links to port C are shown in the ACL entries 278 for ports A and D. Upon receiving rebuilt message ZDM 4 adding allocated port C, the data forwarder (DF) 6a, 6n may then add ACL entries 2280 for all allocated ports A, C, and D in the network 1.

Figure 13:
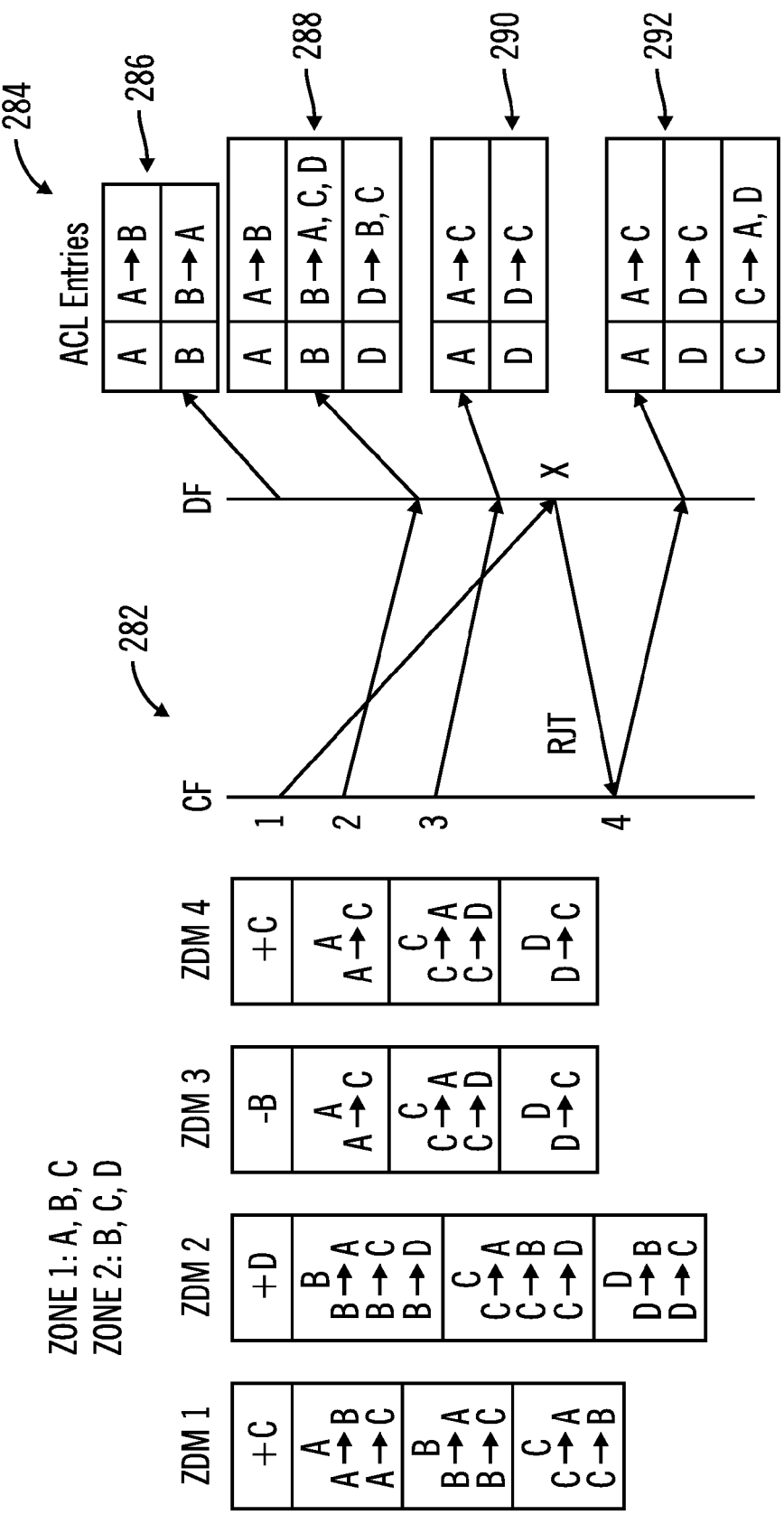

FIG. 13 illustrates an example of the result of the operations performed in FIGS. 5-9 on zone information when processing four zone distribution messages ZDM 1, ZDM 2, ZDM 3, and ZDM 4 for ports A, B, C, and D, which are in two zones 1 and 2 having ports A, B, C and ports B, C, D, respectively, according to FIGS. 5-9. ZDM 1 is sent to allocate port C and provide peer information for ports A, B, and C. In ZDM 2, port D is allocated and provides peering entries for links between A, B, C, and D, where ports A and D are in different zones. In ZDM 3, port B is deallocated with peering entries for links between A, C, D. ZDM 4 allocates port C and provides peering entries for links between A, C, and D. FIG. 13 shows a timeline 282 of the zone distribution messages sent between the controlling forwarder (CF) 4 and a data forwarder (DF) 6a, 6b, which shows that the data forwarder (DF) receives ZDM 2 and ZDM3 before ZDM 1. Because the messages are sent out of order, the data forwarder (DF) sends a rejection message (RJT) with respect to ZDM 1, which causes the controlling forwarder (CF) to send a rebuilt zone distribution message ZDM 4 according to the operations of FIG. 8 that indicates the port C, allocated in the rejected ZDM 1, and includes all the peering entries for the ports A, C, and D. The ACL entries 284 show how the data forwarder (DF) 6a, 6b adds ACL entries 50 to the zone information 28a, 28b as a result of ZDM 2, ZDM 3 and the rebuilt message ZDM 4 Initially, there are ACL entries 286 for ports A and B. For ZDM 2, the port D ACL entry is added and the port A and B ACL entries 288 are updated to indicate links between A, B, C and D for ports A, B, and D. There is no entry in ACL entries 288 for port C because ZDM 1 allocating port C has not yet arrived, although the links to port C are shown in the ACL entries 288 for ports B and D. Upon receiving ZDM3, the ACL entries 290 are updated to remove the entry for port B, which is deallocated, and update the ACL entries 290 for A and D to remove references to deallocated port B according go the operations of FIG. 5. Links to port C are added to the ACL entries 290 for port A although there is no port C allocated peering entry for port A provides a link for port .C. Upon receiving rebuilt message ZDM 4 adding allocated port C, the data forwarder (DF) 6a, 6n may then add ACL entries 292 for all allocated ports A, C, and D in the network 1.

Described embodiments provide techniques for updating zone information in a distributed switch comprised of forwarders by using sequence numbers at the controlling forwarder and data forwarders to have the data forwarders reject received zone distribution messages having a sequence number lower than the last accepted and processed zone distribution message. If a zone distribution message is rejected, the controlling forwarder rebuilds a zone distribution message to indicate the allocated/deallocated port in the rejected message and provide the current set of links between ports. Described embodiments provide for the handling of zone distribution messages received out of order to provide for updating zone information when ports have not been allocated or deallocated according to the order in which the zone distribution messages are received.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing zoning information for ports in a network and in communication with data forwarders, the computer program product comprising a non-transitory computer readable storage medium having computer readable program code embodied therein that executes to perform operations, the operations comprising:

maintaining for each data forwarder a sequence number for zone distribution messages sent to the data forwarder;

detecting a change to the ports in the network comprising at least one of an allocation or deallocation of at least one port in the network;

incrementing the sequence number for each data forwarder in response to detecting the change;

generating for each data forwarder a zone distribution message indicating the at least one port allocated and/or deallocated, port information indicating each port in the network that may communicate with each other port, and the sequence number for the data forwarder, wherein the data forwarder uses the sequence number to determine whether the zone distribution message was received out of order with respect to a last processed zone distribution message at the data forwarder; and transmitting the zone distribution message generated for each data forwarder to the data forwarder for which the zone distribution message was generated.

2. The computer program product of claim 1, wherein the operations further comprise:

receiving from a rejecting data forwarder comprising one of the data forwarders a rejection message rejecting an identified zone distribution message transmitted to the rejecting data forwarder;

incrementing the sequence number for the rejecting data forwarder in response to receiving the rejection message;

determining the at least one port allocated and/or deallocated in the rejected zone distribution message;

generating a new zone distribution message indicating the at least one port allocated and/or deallocated in the identified rejected zone distribution message and the sequence number; and transmitting the new zone distribution message to the rejecting data forwarder.

3. The computer program product of claim 2, wherein the operations further comprise:

including in the new zone distribution message port information indicating each port in the network that may communicate with each other port in the network.

4. The computer program product of claim 1, wherein the operations further comprise:

processing a zone reset operation to reset the zone information in the network;

resetting the sequence numbers for the data forwarders to an initial value in response to detecting the zone reset operation; and sending a zone reset message to the data forwarders to cause the data forwarders to reset their zone information and reset their zone distribution message sequence numbers to zero.

5. The computer program product of claim 1, wherein the ports in the network provide communication with host systems using a first network communication protocol, and wherein a second network communication protocol is used to communicate with the data forwarders.

6. The computer program product of claim 5, wherein the first network communication protocol comprises Fibre Channel, wherein the data forwarders comprise Fibre Channel Over Ethernet (FCoE) data forwarders that form a Distributed Fibre Channel Fabric, and wherein the second communication protocol comprises Ethernet.

7. A computer program product for managing zoning information for ports in a network and in communication with a controlling forwarder, the computer program product comprising a non-transitory computer readable storage medium having computer readable program code embodied therein that executes to perform operations, the operations comprising:

maintaining the zoning information indicating each port that may communicate with each other port in the network and a last received sequence number included in a last accepted zone distribution message;

receiving from the controlling forwarder a zone distribution message indicating at least one port allocated and/or deallocated, port information indicating each port in the network that may communicate with each other port in the network, and the sequence number indicating a sequence number of the zone distribution message;

determining whether the sequence number in the zone distribution message is greater than the last received sequence number; and updating the zone information to indicate the at least one port allocated and/or deallocated and include information on the ports in the network that may communicate with each other port in response to determining that the sequence number in the zone distribution message is greater than the last received sequence number.

8. The computer program product of claim 7, wherein the operations further comprise:

updating the last received sequence number to indicate the sequence number in the received zone distribution message in response to determining that that the sequence number in the zone distribution message is greater than the last received sequence number; and sending an accept zone distribution message to the controlling forwarder in response to determining that that the sequence number in the zone distribution message is greater than the last received sequence number.

9. The computer program product of claim 7, wherein the operations further comprise:

sending a rejection message to the controlling forwarder indicating a rejection of the zone distribution message in response to determining that the sequence number in the zone distribution message is not greater than the last received sequence number, wherein the zone information is not updated with the information in the rejected zone distribution message.

10. The computer program product of claim 7, wherein the zone distribution message includes a peering entry for each port in the network indicating the ports with which the port may communicate in the network, wherein the updating the zone information comprises:

maintaining zone information indicating ports in the network;

determining whether the peering entries in the zone distribution message identify ports in the zone information; and updating the zone information with information in the peering entries for ports indicated in the zone information, wherein the zone information is not updated with information in peering entries for ports not indicated in the zone information.

11. The computer program product of claim 10, wherein the updating the zone information comprises:

updating the zone information to indicate the at least one port as allocated and/or deallocated in the zone distribution message, wherein the determining from the zone information whether the peering entries in the zone distribution message are indicated in the zone information is performed after updating the zone information to indicate the at least one port allocated and/or deallocated.

12. The computer program product of claim 7, wherein the ports in the network provide communication with host systems using a first network communication protocol, and wherein a second network communication protocol is used to communicate with the controlling forwarder.

13. The computer program product of claim 12, wherein the first network communication protocol comprises Fibre Channel, wherein the controlling forwarder comprises a controlling Fibre Channel Over Ethernet (FCoE) forwarder to manage zone information in data FCoE data forwarders, and wherein the second communication protocol comprises Ethernet.

14. A system for managing zoning information for ports in a network and in communication with data forwarders, comprising:

a controller for performing operations, the operations comprising:

maintaining for each data forwarder a sequence number for zone distribution messages sent to the data forwarder;

detecting a change to ports in the network comprising at least one of an allocation or deallocation of at least one port in the network;

incrementing the sequence number for each data forwarder in response to detecting the change;

generating for each data forwarder a zone distribution message indicating the at least one port allocated and/or deallocated, port information indicating each port in the network that may communicate with each other port, and the sequence number for the data forwarder, wherein the data forwarder uses the sequence number to determine whether the zone distribution message was received out of order with respect to a last processed zone distribution message at the data forwarder; and transmitting the zone distribution message generated for each data forwarder to the data forwarder for which the zone distribution message was generated.

15. The system of claim 14, wherein the operations further comprise:

receiving from a rejecting data forwarder comprising one of the data forwarders a rejection message rejecting an identified zone distribution message transmitted to the rejecting data forwarder;

incrementing the sequence number for the rejecting data forwarder in response to receiving the rejection message;

determining the at least one port allocated and/or deallocated in the rejected zone distribution message;

generating a new zone distribution message indicating the at least one port allocated and/or deallocated in the identified rejected zone distribution message and the sequence number; and transmitting the new zone distribution message to the rejecting data forwarder.

16. The system of claim 15, wherein the operations further comprise:

including in the new zone distribution message port information indicating each port in the network that may communicate with each other port in the network.

17. A system for managing zoning information for ports in a network and in communication with a controlling forwarder, comprising:

a controller for performing operations, the operations comprising:

maintaining the zone information indicating each port that may communicate with each other port in the network and a last received sequence number included in a last accepted zone distribution message;

receiving from the controlling forwarder a zone distribution message indicating at least one port allocated and/or deallocated, port information indicating each port in the network that may communicate with each other port in the network, and the sequence number indicating a sequence number of the zone distribution message;

determining whether the sequence number in the zone distribution message is greater than the last received sequence number;

updating the zone information to indicate the at least one port allocated and/or deallocated and include information on the ports in the network that may communicate with each other port in response to determining that the sequence number in the zone distribution message is greater than the last received sequence number.

18. The system of claim 17, wherein the operations further comprise:

updating the last received sequence number to indicate the sequence number in the received zone distribution message in response to determining that that the sequence number in the zone distribution message is greater than the last received sequence number; and sending an accept zone distribution message to the controlling forwarder in response to determining that that the sequence number in the zone distribution message is greater than the last received sequence number.

19. The system of claim 17, wherein the operations further comprise:

sending a rejection message to the controlling forwarder indicating a rejection of the zone distribution message in response to determining that the sequence number in the zone distribution message is not greater than the last received sequence number, wherein the zone information is not updated with the information in the rejected zone distribution message.

20. The system of claim 17, wherein the zone distribution message includes a peering entry for each port in the network indicating the ports with which the port may communicate in the network, wherein the updating the zone information comprises:

maintaining zone information indicating ports in the network;

determining whether the peering entries in the zone distribution message identify ports in the zone information; and updating the zone information with information in the peering entries for ports indicated in the zone information, wherein the zone information is not updated with information in peering entries for ports not indicated in the zone information.

21. The system of claim 20, wherein the updating the zone information comprises:

updating the zone information to indicate the at least one port as allocated and/or deallocated in the zone distribution message, wherein the determining from the zone information whether the peering entries in the zone distribution message are indicated in the zone information is performed after updating the zone information to indicate the at least one port allocated and/or deallocated.

22. The system of claim 17, wherein the operations further comprise:

processing a zone reset operation to reset the zone information in the network;

resetting the sequence numbers for the data forwarders to an initial value in response to detecting the zone reset operation; and sending a zone reset message to the data forwarders to cause the data forwarders to reset their zone information and reset their zone distribution message sequence numbers to zero.

23. The system of claim 17, wherein the ports in the network provide communication with host systems using a first network communication protocol, and wherein a second network communication protocol is used to communicate with the data forwarders.

24. The system of claim 23, wherein the first network communication protocol comprises Fibre Channel, wherein the data forwarders comprise Fibre Channel Over Ethernet (FCoE) data forwarders that form a Distributed Fibre Channel Fabric, and wherein the second communication protocol comprises Ethernet.

25. The system of claim 17, wherein the ports in the network provide communication with host systems using a first network communication protocol, and wherein a second network communication protocol is used to communicate with the controlling forwarder.

26. The system of claim 25, wherein the first network communication protocol comprises Fibre Channel, wherein the controlling forwarder comprises a controlling Fibre Channel Over Ethernet (FCoE) forwarder to manage zone information in data FCoE data forwarders, and wherein the second communication protocol comprises Ethernet.

* * * * *